United States Patent
Wilkinson et al.

(10) Patent No.: US 8,090,538 B2
(45) Date of Patent: Jan. 3, 2012

(54) SYSTEM AND METHOD FOR INTERPRETATION OF WELL DATA

(75) Inventors: David A. Wilkinson, Concord, CA (US); Tina Yu, St. John's (CA)

(73) Assignee: Chevron U.S.A. Inc, San Ramon, CA (US)

( * ) Notice: Subject to any disclaimer, the term of this patent is extended or adjusted under 35 U.S.C. 154(b) by 642 days.

(21) Appl. No.: 12/113,821

(22) Filed: May 1, 2008

(65) Prior Publication Data

US 2009/0276157 A1 Nov. 5, 2009

(51) Int. Cl.
*G01V 5/12* (2006.01)
*G01V 5/10* (2006.01)

(52) U.S. Cl. ............................................... 702/8; 702/11
(58) Field of Classification Search ................ 702/8, 11, 702/12, 14, 189; 250/269.6
See application file for complete search history.

(56) References Cited

U.S. PATENT DOCUMENTS

| | | | |
|---|---|---|---|
| 6,363,327 B1 | 3/2002 | Wallet et al. | |
| 7,577,529 B2 * | 8/2009 | Rietsch | 702/14 |
| 2004/0220782 A1 | 11/2004 | Cook | |
| 2007/0246649 A1 | 10/2007 | Jacobi et al. | |

FOREIGN PATENT DOCUMENTS

WO WO 2009/026371 2/2009

OTHER PUBLICATIONS

Kacprzyk, Janusz, Studies in Computational Intelligence, XP002553153, Jan. 23, 2008, pp. 199-218, Srpinger Berlin / Heidelberg.
Being-Zih Hsieh, et al., Lithology identification of aquifers from geophysical well logs and fuzzy logic analysis: Shui-Lin Area, Taiwan, XP002553152, vol. 31, 2005, Computer nd Geosciences, the whole document.
Chun-Nan Hsu, et al., "Generating:Finite-State Transducers for Semi-Structured Data Extraction from the Webb," Informatin Systems, vol. 23; No. 8, pp. 521-538, 1998.
Jessica Lin, et al., "A Symbolic Representation of Time Series, with Implications for Streaming Algorithms," Univ. of CA, Riverside, pp. 2-11, DMKD '03, Jun. 13, 2003.
T. Yu and D. Wilkinson " A Fuzzy Symbolic Representation for Intelligent Reservoir Well Logs Interpretation," In Soft Computing for Hybrid Intelligent Systems, pp. 417-426, Castillo, O.; Melin, P.; Kacprzyk, J.; Pedrycz, W. (Eds.), Springer, 2008.
Daniel Gildea and Daniel Jurafskyd. "Automatic Induction of Finite State Transducers for Simple Phonological Rules." In Proceedings of the 33rd Conference on Association for Computational Linguistics, pp. 9-15, Morgan Kaufmann, San Francisco, CA, 1995.
Considered in Information Disclosure Statement Filed May 9, 2008.

(Continued)

*Primary Examiner* — John H Le
(74) *Attorney, Agent, or Firm* — Carlos L. Hanze (57) ABSTRACT

Well log data is assigned depositional labels by a soft computing method. A model is trained on an expert-interpreted well log by segmenting, assigning fuzzy symbols to the segments, and calculating attribute values for units labeled by the expert. From these values, classifiers are trained for each of a number of depositional types. Finally, a model is developed for translating fuzzy symbols into depositional labels. Once trained, the model is applied to well log data.

12 Claims, 5 Drawing Sheets

OTHER PUBLICATIONS

S. M. Lucas and T. J. Reynolds, "Learning Finite State Transducers: Evolution Versus Heuristic State Merging." IEEE Transactions on Evolutionary Computation, vol. 11 No. 3, pp. 308-325, Jun. 2007.

M. A. Potter and K. A. De Jong. "A Cooperative Coevolutionary Approach to Function Optimization." In Parallel Problem Solving from Nature—PPSN III, pp. 249-257, Davidor, Yuval; Schwefel, Hans-Paul; Männer, Reinhard (Eds.), Berlin, Springer ,1994.

T. Yu and C. Clack, "PolyGP: A Polymorphic Genetic Programming System in Haskell," In Genetic Programming 1998: Proceedings of the Third Annual Conference, J. R. Koza et. al., (editors), pp. 416-427, Morgan Kaufmann, 1998.

* cited by examiner

SYSTEM AND METHOD FOR INTERPRETATION OF WELL DATA

BACKGROUND

1. Field of the Invention

The present invention relates generally to stratigraphic interpretation of well logs and more particularly to an automated interpretation system and method.

2. Description of the Related Art

It is possible to predict oil recovery efficiency of a reservoir by an analysis of information relating to the depositional environment in which the reservoir was formed. In this approach, identification and labeling of depositional units is generally performed by experienced expert stratigraphers who review well logs and mark unit boundaries and identify units by hand. As a result, information obtained from these analyses can vary according to the particular expert performing the analysis, and the time required to analyze a large number of well logs can be quite long. Automation of the analysis of well logs can reduce the stratigrapher's workload and may provide more uniformity of analysis.

SUMMARY

Aspects of embodiments of the present invention provide a method of interpreting well log data indicative of physical attributes of a portion of a subterranean formation including partitioning the well log data into segments, each segment representing a respective contiguous portion of the extent of the logged well, defining a membership function for each segment, the membership function defining a degree to which each segment belongs to a defined set, and determining, based on attribute values derived from previously interpreted depositional units, and the membership functions, a depositional type for each segment.

Aspects of embodiments of the present invention include a system for automated interpretation of well log data indicative of physical attributes of a portion of a subterranean formation including a data storage device, configured and arranged to store the well log data, and a processor, configured and arranged to execute machine executable instructions to partition the well log data into segments, each segment representing a respective contiguous portion of the extent of the logged well, to define a membership function for each segment, the membership function defining a degree to which each segment belongs to a defined set, and to determine, based on attribute values derived from previously interpreted depositional units, and the membership functions, a depositional type for each segment.

Aspects of embodiments of the invention may include a computer-readable medium encoded with computer-executable instructions for performing the foregoing method or for controlling the foregoing system.

Aspects of embodiments of the invention may include a system incorporating the foregoing system and configured and arranged to provide control of the system in accordance with the foregoing method. Such a system may incorporate, for example, a computer programmed to allow a user to control the device in accordance with the method, or other methods.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The inventors have determined that well log interpretation may be performed based on a trained expert system employing fuzzy logic rules for classifying depositional units.

One systematic approach to identify and label stratigraphic components of deepwater reservoirs is by describing them within a hierarchical framework that is based on the physical attributes of the strata and is generally independent of thickness and time. In this framework, the fundamental building block of this hierarchical classification is an element, defined herein as a cross-sectional characterization of the volume of sediment deposited within a single cycle of deposition and bounded by an avulsion or abandonment. With this classification scheme, individual elements exhibit a generally predictable change from axis to margin in grain size, litho-facies type and architectural style. Meanwhile, since avulsion, which is the lateral shifting of a channel or lobe, controls the distribution of these characteristics, elements can be used to understand the distribution of reservoir and non-reservoir facies.

Two or more elements of similar grain size, litho-facies and architectural style form a complex. Elements within a complex are genetically related and exhibit a predictable organization and depositional trend. A complex set is comprised of either individual complexes of different architectural style and/or complexes of similar architectural style that exhibit depositional trends independent of one another. The description of deepwater sand-bodies utilizing this hierarchical approach provides a methodology to directly compare similar stratigraphic components and may generally improve reservoir characterization and the prediction of productivity.

Though the following discussion concentrates on gamma ray logging, deepwater reservoirs and a particular group of depositional types, the methods and systems described may be applicable to other environments and other classifications of the elements present in those environments. As will be appreciated, for certain other classifications, data other than gamma ray may be the most useful. Likewise, other types of data may be used in addition to gamma ray where such secondary data (resistivity, x-ray, ultrasound or NMR, for example) is useful in distinguishing two classifications that appear similar on gamma ray logs.

For reservoir exploration in a deepwater environment, the elements that are of particular interest are channel related as they are the areas where hydrocarbon (oil and gas) deposits may be found. For a finer characterization of a reservoir, channel-elements may be subdivided into channel-axis, channel off-axis, and channel-margin associations. Channel-axis deposits (A) are dominated by highly-amalgamated, massive sandstones deposited by high-concentration turbidity currents and gamma ray well logs exhibit a sharp-based, blocky-response. The channel off-axis association (OA) typically displays a weakly blocky to a moderately serrated gamma ray log character and typically is built from stacked, semi- to non-amalgamated, massive to planar-stratified sandstones and inter-laminated shales. The channel-margin deposits (M) contain a variety of litho-facies and are characterized by a hetero-lithic mixture of high and low-concentration turbiditic sandstones interbedded with thick shales exhibiting a serrated, and generally high gamma ray log response.

Two other element types that are non-channel and may be identified and separated from channel elements are overbank and mass transport complexes. Overbank deposits (OB) are dominated by shale and interbedded with thin sandstones which display an irregular character, lacking a distinct gamma ray log trend. Mass transport complexes (MTC) consist of aggregated components dominated by mass transport. Mass wasting of basin margins and the influx of large quantities of re-sedimented material may occur at any time as a basin fills. Depending on their source, these complexes can either be very muddy or very sandy, but all tend to be internally chaotic. Due to the lithologic variability of MTC, it may be difficult to uniformly characterize their log response, but commonly they display an irregular, chaotic character with an elevated gamma ray response.

In view of the differences between gamma ray logging responses for each of the above types of elements, the inventors have determined that a machine learning approach to interpretation of the gamma ray logs may be useful. In this approach, gamma ray data and depositional labels applied by an expert interpreter are used to train an expert system, such that the expert system will be able to replicate the human interpreter's results and to apply similar logic in analysis of new well logs.

Figure 1:
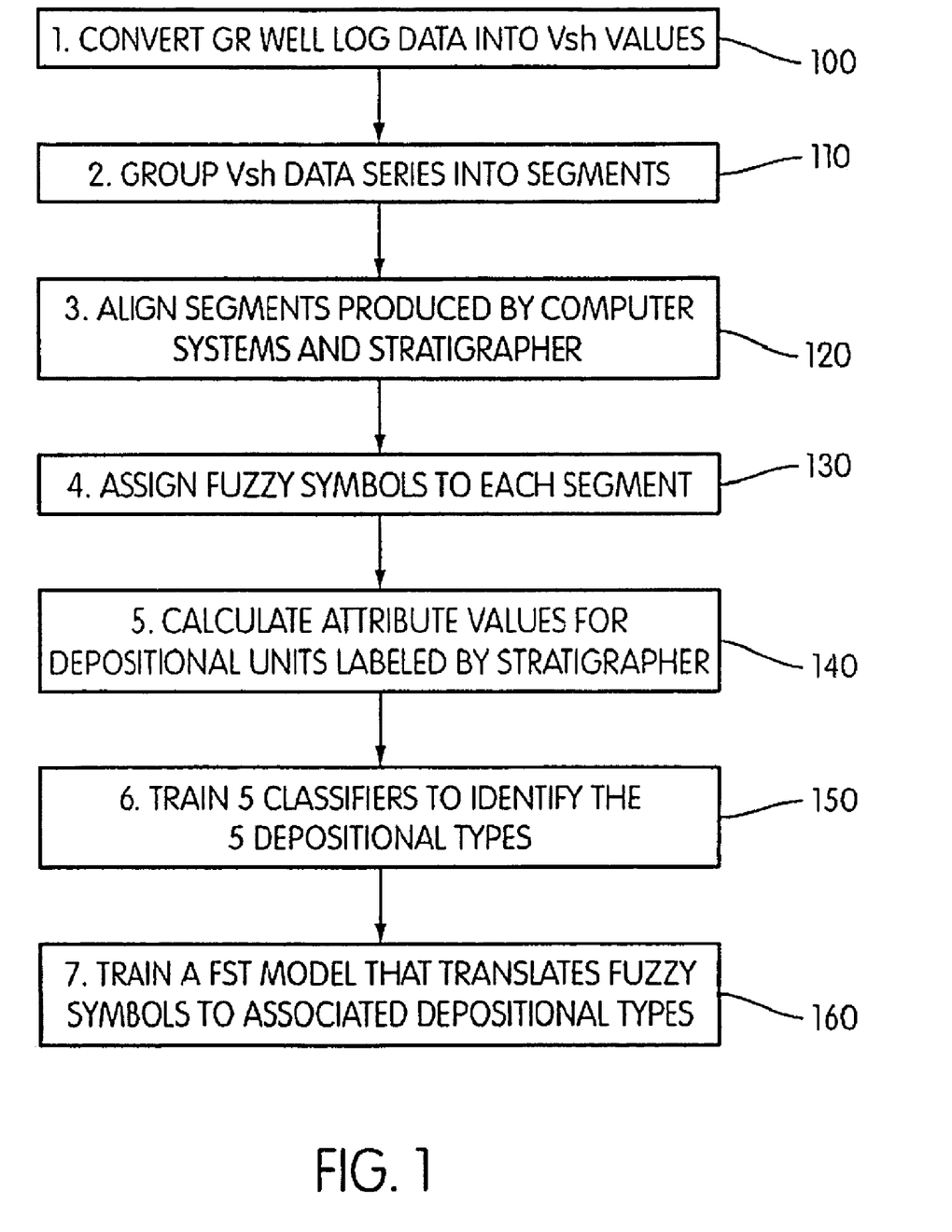
FIG. 1 is a flow chart illustrating an embodiment of a method in accordance with an embodiment of the present invention.

A particular example of an embodiment of a method in accordance with this approach is illustrated in FIG. 1. At 100, gamma ray data from an expert interpreted log, in API units, is converted in to normalized $V_{sh}$ data in accordance with Equation 1:

$$Vsh_i = \begin{cases} 0, & GR_i < GR_{min}; \\ \dfrac{GR_i - GR_{min}}{GR_{max} - GR_{min}}, & GR_{min} \le GR_i \le GR_{max}; \\ 1, & GR_i > GR_{max}. \end{cases} \quad (1)$$

Where $V_{sh}$ is a measurement of volume of shale, $GR_{min}$ is a minimum reading from the log and $GR_{max}$ is a maximum reading from the log.

At 110, the normalized $V_{sh}$ data is segmented on the basis of similarity within grouped elements. In one approach to segmentation, adjacent portions of the log are grouped together. As adjacent points are added to the segment, variance is determined for the new segment and as a threshold variance is reached, or alternately as a change in variance reaches a threshold value, the segment is ended and a new segment is begun. Optionally, image analysis software that segments image data based on various measures of homogeneity, such as eCognition, from Definiens of Munich, DE, can be used to organize the logs into segments. Other machine executed segmentation approaches may be useful in this regard.

At 120, segments of the expert interpreter's labeled elements are optionally adjusted to correct for minor edge effects due to interpretation variation (i.e., where the automated segmentation and the expert's segmentation differ, either one or both may be adjusted so that they are the same). Generally, the expert's segmentation will be adjusted to correspond to the automated segmentation. Where these differences are large, it may be useful to re-run the automated segmentation using different segmentation criteria to ensure closer correspondence between the two.

The segmented $V_{sh}$ data are represented as a series of numerical values $\overline{V_{sh}} = \overline{s}_1, \overline{s}_2, \overline{s}_3, \ldots, \overline{s}_i$, where $\overline{s}_i$ is an average of the data within the ith segment. Depending on a value range that $\overline{s}_i$ falls into, its associated fuzzy symbol(s) can be determined at 130. Particular examples of this association is described in more detail below.

The transformed fuzzy symbols are ready to be used to train models, for example, a finite state transducer (FST) model that translates the fuzzy symbols to depositional labels.

In the machine language setting, a FST is a model that maps strings in a source language into a string in a target language. The decision of what output symbol to produce depends on two factors: the input symbol and the current state. A human interpreter of stratigraphic data, a stratigrapher considers other factors, such as the thickness of each block and the degree of variation of neighboring blocks, to give interpretation. In other words, the output symbol is decided by additional model parameters in addition to the input symbol and the current state. This model is a decision model that gives one of the five possible depositional types (in the deepwater environment of the example) as its output.

Using a co-evolutionary system a model that approaches the results of the human stratigrapher can be developed. In order to construct the model that contains similar knowledge as that used by the stratigrapher to classify five different depositional types, a set of attribute values listed in Table I for every depositional unit identified by the stratigrapher are calculated at 140.

TABLE I

| symbol % | symbol thickness | symbol max |
|---|---|---|
| a % | a_thickness | a_max |
| Ab % | ab_thickness | ab_max |
| Ba % | ba_thickness | ba_max |
| b % | b_thickness | b_max |
| Bc % | bc_thickness | bc_max |
| Cb % | cb_thickness | cb_max |
| c % | c_thickness | c_max |
| Cd % | cd_thickness | cd_max |
| Dc % | dc_thickness | dc_max |
| d % | d_thickness | d_max |
| variation | total_thickness | no_segments |

Each depositional unit can contain one or more Vsh symbols. In Table I, "symbol %" column gives the percentage of each symbol's thickness over the total thickness of the unit. The "symbol thickness" column gives the accumulated thickness of each symbol in the unit. The "symbol max" column gives the maximum thickness of each symbol in the unit. The variation is the average distance of the neighboring symbols in the unit, where distance is defined as the number of jumps between two symbols. For example, the distance between symbols a and dc is 8. Variation of symbol sequence a, ba, dc is (2+6)/2=4.

At 150, the attribute values calculated at 140 are used to train five classifiers. The five classifiers, in addition to the gamma ray fuzzy symbol inputs and their associated thickness, are then used to train an FST as the final model at 160. Note that it is theoretically possible that the expert interpreted log training source could be replaced with a log that itself has been interpreted with an expert system, either that of the present invention, or another such system. In principle, what is important is that the training interpretation is reliable rather than the ultimate source. In this regard, if core data or other sources of corroboration for the well log interpretation are available, such data may be used to improve the reliability of the training process.

To apply the trained FST model to interpret gamma ray log data, the log to be interpreted is transformed into symbols in a manner similar to running through the process from 100 to 130 for the expert interpreted log. Once converted into the appropriate symbolic system at 130, the new log data may be interpreted according to the rules derived from processing the training data.

Returning to the segmentation process 120 described briefly above, there are various available segmentation approaches. In the embodiment described above based on variance of the segment, each segment is allowed to have arbitrary length. As a result, for portions of the log where there is little variation, segments will be relatively long. On the other hand, for a highly variable portion of the log, segments will be relatively short and that portion will have many segments.

In an embodiment, the first iteration of segmentation assigns every data point to its own segment. Neighboring data points are added to existing segments until the number of segments reaches a predetermined number of segments. At each step, segments whose merging will lead to the smallest increase in error are combined. Error is defined according to Equation 2:

$$\text{error} = \sum_{i=1}^{n} (d_i - \mu_a)^2 \quad (2)$$

where n is the number of data points in segment a, $\mu_a$ is the mean of segment a, and $d_i$ is the ith data value in segment a. Because total error increases as the number of segments decreases, and because interpretation becomes more difficult as the number of segments increases, the authors have developed an error criterion that takes these factors into account and is shown in Equation 3:

$$f = N + \sum_{i=1}^{N} \text{error}_i \quad (3)$$

where N is the number of segments. Thus, the weighted error becomes the total previous error plus the number of segments, so that as segments increase, the error criterion increases, tending to bias the ending number of segments down.

As described above, each segment is assigned its mean value of $V_{sh}$ to represent it. Then each of four symbols a, b, c, d can be assigned according to the rule of Equation 4:

$$\text{symbol}_i = \begin{cases} a, & \overline{s_i} < 0.3; \\ b, & 0.3 \leq \overline{s_i} < 0.5; \\ c, & 0.5 \leq \overline{s_i} < 0.7; \\ d, & \overline{s_i} > 0.7 \end{cases} \quad (4)$$

While some segments are clearly within the boundary of a particular symbol region, others may not be so clear. For example, segments with a value close to 0.3 belong to symbol a according to Equation 4, but also lie close to symbol b. Furthermore, because these represent averages, it is likely that portions of the segment are in one region while other portions would lie within the other region if they were independently evaluated. As a result, for values close to boundaries, a crisp symbol may not accurately represent the segment. Thus, we can assign fuzzy symbols using a membership function to express the concept that the segment can be interpreted as belonging to both symbols a and b to some degree.

As described in Yu and Wilkinson, *A Fuzzy Symbolic Representation for Intelligent Reservoir Well Logs Interpretation*, 2007, herein incorporated by reference, four trapezoidal membership functions may be used to map the segments into the 10 symbols a, ab, etc., described in Table I above. In this convention, ab indicates that a segment belongs to both a and b and more to a than b, while ba means that it belongs more to b than to a.

Figure 2:
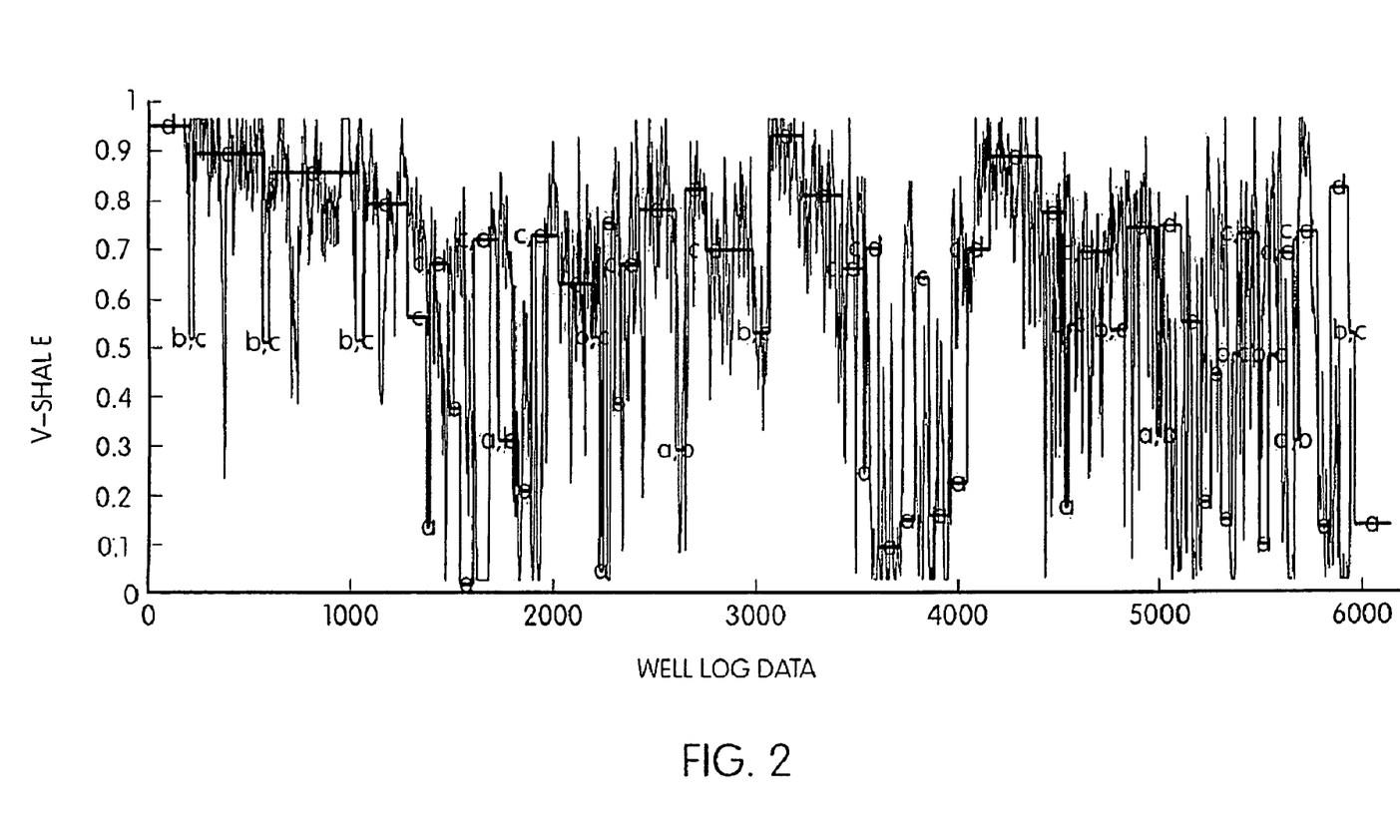
FIG. 2 is an example of a set of data assigned a set of fuzzy symbols in accordance with an embodiment of the present invention.

FIG. 2 illustrates example data that has been segmented and mapped into 62 symbolized segments. Because the boundaries of the automated segmentation do not necessarily align with boundaries indicated by the expert interpretation (in this case a stratigrapher) certain segments were subdivided at the depositional label position contained within that segment, increasing the number of symbol regions to 82.

Each depositional unit then contains between one and five segments of varying thickness. Attributes in accordance with Table I are calculated and used to train the five classifiers in accordance with a co-evolutionary system. The use of a co-evolutionary system can be beneficial where, as here, some classifications contain relatively few data points (e.g., only four of the classifications in the example data are A and four are MTC), while others contain a large number (e.g., 14 are M, 19 are OB).

Figure 3:
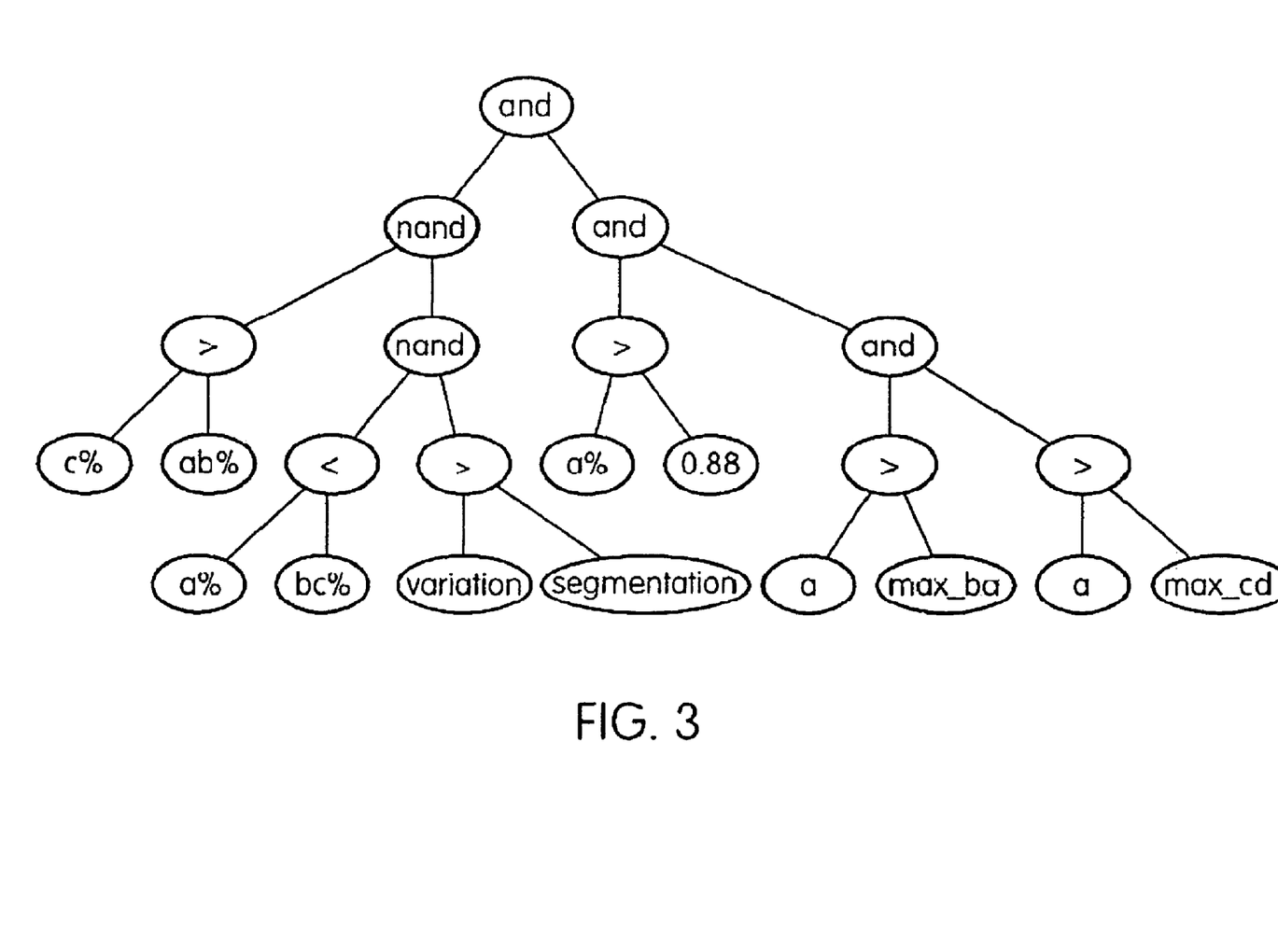
FIG. 3 is an illustration of a rule tree representing an end-point of a co-evolutionary rule tree development process in accordance with an embodiment of the present invention.

In this approach, a classifier is represented as a rule tree as illustrated in FIG. 3. This example rule-tree defines the class A and represents an end-point of a co-evolutionary rule tree development process. Rule trees for each classifier are evolved simultaneously and fitness of each evolved rule is determined by how it collaborates with the other evolved rules to perform the classification task.

In this regard, a rule from one population is combined with the best rules in the four other populations using an if-then-else template, such as the following:

```
if (OA-rule is evaluated to be True)
    then OA
else if (A-rule is evaluated to be True)
    then A
else if (MTC-rule is evaluated to be True)
    then MTC
else if (OB-rule is evaluated to be True)
    then OB
else M.
```

The combined team's performance then defines the fitness of the rule in the current population. For the first generation, a rule is randomly selected from each population and assigned as the best rule for that population. After that, best rules are updated iteratively on the basis of actual performance. As will be appreciated, other rule generating processes may be used. Likewise, variations of the described process may include a hill-climbing approach to determining an order of the rule sequence that gives best performance.

Once the five classifiers are determined, the FST may be evolved. The input string for the transducer consists of a sequence of symbols representing $V_{sh}$ values (i.e., the symbols a %, ab %, etc. described above) while the output is a sequence of depositional labels. As an example, an FST in accordance with the present invention can be represented as a pair of tables, a transition table and an output table.

Figure 4:
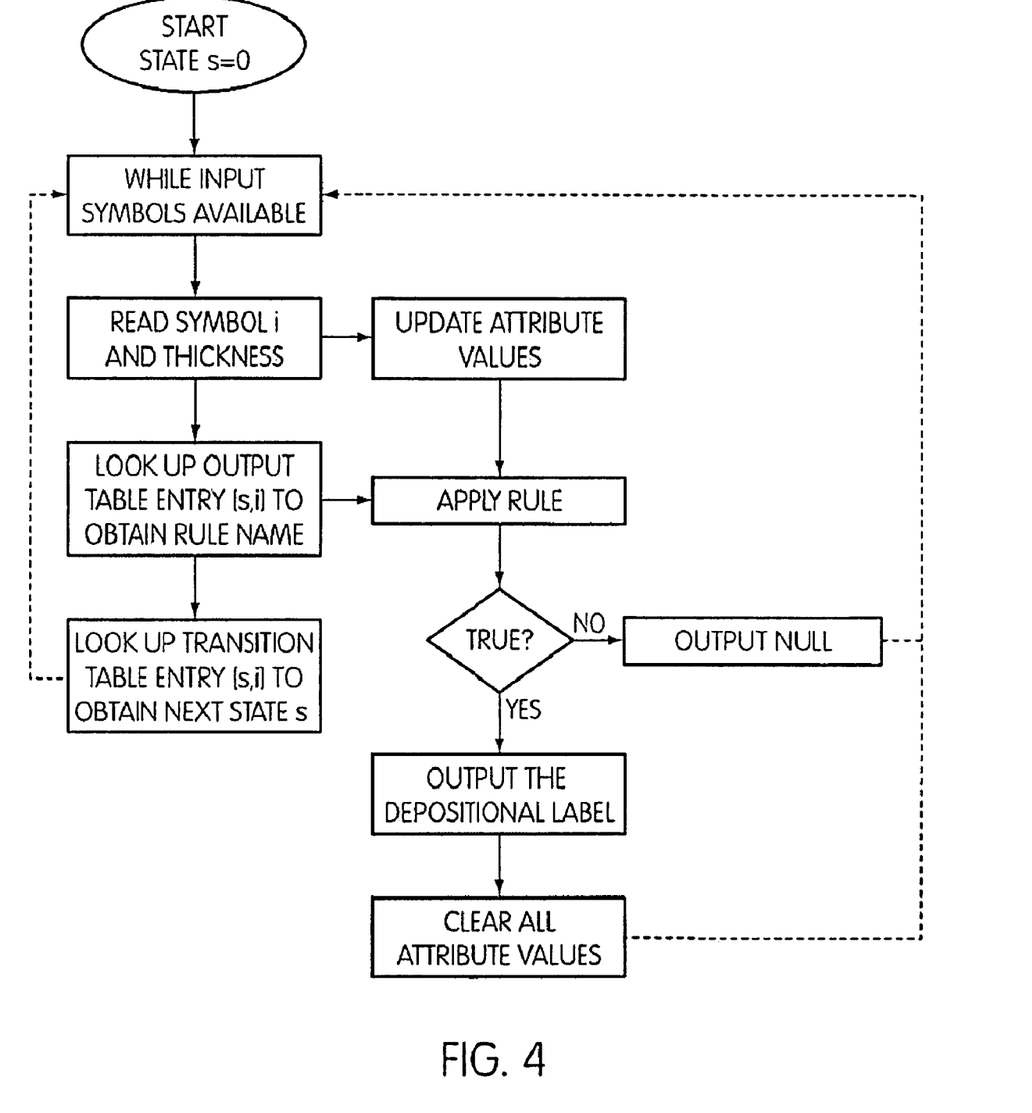
FIG. 4 is a flow chart illustrating an operating workflow for an FST in accordance with an embodiment of the present invention.

As an example of the flow of the chart illustrated in FIG. 4, and illustrating the use of the FST represented in Tables II and III, operation on input symbols (d, 96, d, 3, cb, 12.5). With the initial state 0 and input symbol d, the proposed classification rule is OB, according to the output table. After updating the attribute information, OB rule is executed. Assuming the rule returns true on the attribute value, OB is the output symbol. All attribute information in the database are cleared and the system moves to state 18 according to the transition table. Next, symbol d is processed and the attribute values are updated. The proposed rule according to output table is OA. Assuming the rule returns false on the attribute values, null is the output symbol. The system moves to state 10 without erasing the attribute values.

The next symbol to process is cb. The attribute values will now reflect the information of two segments (d and cb). The

TABLE II

TRANSITION TABLE

| input | a | ab | ba | b | bc | cb | c | cd | dc | d |
|---|---|---|---|---|---|---|---|---|---|---|
| S0 | S8 | S2 | S19 | S9 | S1 | S14 | S11 | S7 | S18 | S18 |
| S1 | S9 | S17 | S4 | S5 | S3 | S2 | S14 | S12 | S2 | S10 |
| S2 | S9 | S18 | S1 | S10 | S3 | S9 | S16 | S4 | S1 | S3 |
| S3 | S15 | S9 | S15 | S0 | S16 | S13 | S14 | S17 | S16 | S2 |
| S4 | S0 | S0 | S17 | S8 | S7 | S9 | S3 | S6 | S6 | S13 |
| S5 | S14 | S12 | S9 | S0 | S14 | S16 | S6 | S3 | S3 | S8 |
| S6 | S1 | S14 | S12 | S19 | S3 | S1 | S16 | S1 | S3 | S13 |
| S7 | S17 | S19 | S4 | S19 | S3 | S10 | S6 | S5 | S15 | S15 |
| S8 | S12 | S6 | S5 | S13 | S16 | S1 | S4 | S14 | S16 | S3 |
| S9 | S3 | S19 | S4 | S19 | S11 | S1 | S2 | S15 | S16 | S8 |
| S10 | S7 | S9 | S19 | S6 | S16 | S7 | S11 | S15 | S7 | S6 |
| S11 | S4 | S13 | S19 | S18 | S10 | S8 | S19 | S15 | S2 | S12 |
| S12 | S19 | S1 | S6 | S14 | S11 | S9 | S3 | S18 | S3 | S10 |
| S13 | S10 | S11 | S10 | S11 | S7 | S8 | S3 | S15 | S17 | S6 |
| S14 | S9 | S16 | S0 | S3 | S4 | S3 | S8 | S15 | S5 | S3 |
| S15 | S13 | S13 | S3 | S6 | S9 | S8 | S3 | S7 | S18 | S6 |
| S16 | S18 | S6 | S2 | S5 | S0 | S14 | S10 | S14 | S11 | S4 |
| S17 | S9 | S16 | S4 | S6 | S7 | S6 | S13 | S7 | S9 | S4 |
| S18 | S1 | S12 | S19 | S6 | S2 | S9 | S0 | S0 | S5 | S10 |
| S19 | S13 | S2 | S15 | S18 | S14 | S0 | S18 | S2 | S12 | S0 |

TABLE III

OUTPUT TABLE

| input | a | ab | ba | b | bc | cb | c | cd | dc | d |
|---|---|---|---|---|---|---|---|---|---|---|
| S0 | OA | OB | OB | OB | OA | A | MTC | M | OB | OB |
| S1 | OA | MTC | OB | MTC | MTC | M | M | M | OB | M |
| S2 | OB | OA | MTC | OA | MTC | M | OB | M | OA | A |
| S3 | M | OA | OA | A | M | MTC | OB | M | OB | OB |
| S4 | M | MTC | A | OB | M | OB | OA | OB | MTC | OB |
| S5 | M | A | M | OA | M | OA | A | A | MTC | A |
| S6 | A | M | OA | MTC | MTC | OA | OB | OA | M | A |
| S7 | OA | M | M | OB | M | A | M | OA | MTC | M |
| S8 | OA | OB | MTC | MTC | OA | OB | MTC | MTC | M | M |
| S9 | OA | OA | A | A | MTC | MTC | MTC | M | OA | MTC |
| S10 | OA | A | OA | OA | OB | A | MTC | OA | A | OA |
| S11 | MTC | OB | OB | OB | A | MTC | M | A | MTC | OA |
| S12 | M | M | M | MTC | OA | A | OB | MTC | MTC | OB |
| S13 | OA | MTC | M | M | OA | MTC | OB | OB | OA | OA |
| S14 | A | MTC | MTC | MTC | MTC | OA | OB | M | MTC | M |
| S15 | M | OB | OB | A | MTC | A | OB | MTC | A | OB |
| S16 | OA | MTC | A | MTC | MTC | OB | M | MTC | OA | OA |
| S17 | A | OA | A | OA | M | OA | OB | OB | M | M |
| S18 | A | MTC | OB | OA | MTC | A | OB | MTC | OB | OA |
| S19 | A | MTC | A | A | OA | OB | MTC | A | OA | MTC | proposed classification rule is A. Assuming the rule returns true on the updated attribute values, A is the output symbol.

Since there are no more input symbols, the interpretation process terminates. The system clears the attributes memory and moves to state 7. The output sequence produced by the FST on the given input symbols is (OB, null, A). For null output, it may be necessary for a human interpreter to fill in the blanks to provide some interpretation of the segment.

Evolution of the FST is evaluated using a stochastic evolutionary method based on a mutation approach. First, a decision is made with equal probability to either mutate the transition table or the output table. A random location is then selected in the chosen table, and the entry there is modified. This ensures that mutation causes at least one change. After that, an iteration is performed over all the table entries apart from the entry just modified, changing each entry with a probability of $1/N_Q \times N_I$. When an entry is modified, a symbol is chosen from a uniform distribution of all possible symbols except the current symbol. A single call to the mutation operator appears most likely to produce one or two changes to the FST tables, but can also produce more.

The fitness of a FST is based on the output symbols it produces. After processing an input symbol, a FST always produces an output symbol, either it is a depositional label or null. The length of the produced output symbols, hence, is always the same as the length of the input symbols.

The produced output symbols are aligned with the depositional labels produced by the stratigrapher and the number of mis-match between the two is the FST's fitness. A FST that produces all depositional labels correctly at the correct segment position has fitness value 0.

Once the transducer is trained, application of the model to the data under analysis follows in a straightforward manner. As described above, the new data is converted to $V_{sh}$, grouped into segments and the segments are assigned appropriate fuzzy symbols. The fuzzy symbol sequences are then translated, using the transducer, into depositional labels.

The labeled logs may then be used to evaluate suitability of the reservoir for exploitation. Prior to use, it may be useful to include a human interpretation for spot checking labels to evaluate whether the machine interpretation is accurate and/or for filling in null results.

Figure 5:
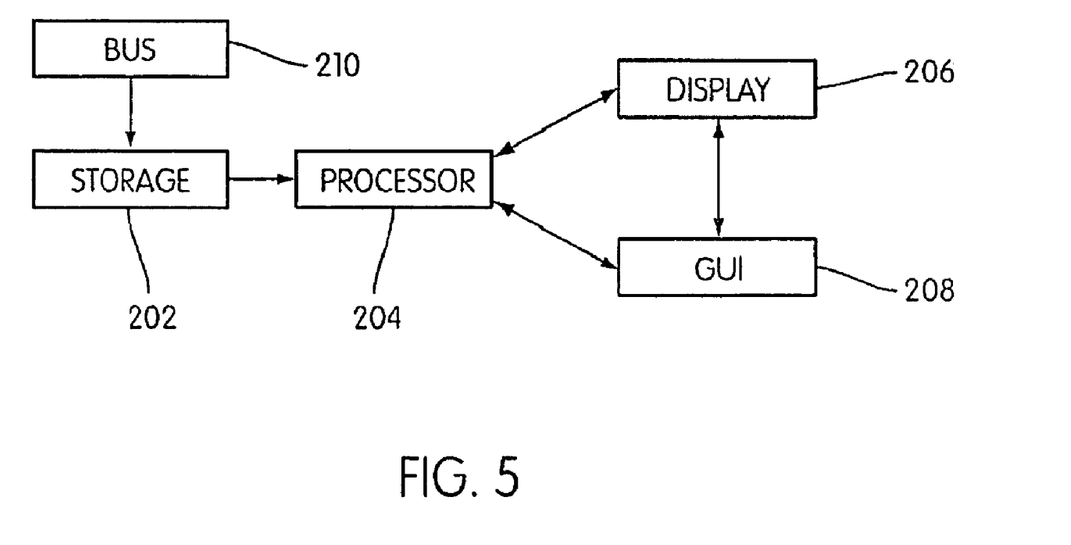
FIG. 5 is a schematic illustration of an embodiment of a system for performing methods in accordance with embodiments of the present invention.

A system for performing the method is schematically illustrated in FIG. 5. A system includes a data storage device or memory 202. The stored data may be made available to a processor 204, such as a programmable general purpose computer. The processor 204 may include interface components such as a display 206 and a graphical user interface 208. The graphical user interface may be used both to display data and processed data products and to allow the user to select among options for implementing aspects of the method. Data may be transferred to the system via a bus 210 either directly from a data acquisition device, or from an intermediate storage or processing facility (not shown).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, though reference is made herein to a computer, this may include a general purpose computer, a purpose-built computer, an ASIC programmed to execute the methods, a computer array or network, or other appropriate computing device. As a further example, it is to be understood that the present invention contemplates that, to the extent possible, one or more features of any embodiment can be combined with one or more features of any other embodiment.

What is claimed is:

1. A computer-implemented method of interpreting well log data indicative of physical attributes of a portion of a subterranean formation comprising:
    partitioning, via computer, the well log data into i segments, each ith segment representing a respective contiguous portion of the extent of the logged well;
    defining, via computer, a membership function for each segment, the membership function defining a degree to which each segment belongs to a defined set; and
    determining, via computer, based on attribute values derived from previously interpreted depositional units, and the membership functions, a depositional type for each segment,
    converting, via computer, the well log data to shale volume data, wherein the shale volume data are represented as a series of numerical values $V_{sh}=s_1, s_2, \ldots, s_i$, where $s_i$ is an average of the shale volume data within the ith segment.

2. The computer-implemented method as in claim 1, wherein the partitioning further comprises applying at least one variation criterion to the well log data such that each segment represents data varying from neighboring data by an amount less than the variation criterion.

3. The computer-implemented method as in claim 1, wherein, subsequent to the partitioning, the segments are compared to a set of segments produced by a human log data interpreter interpreting the same well log data, and differences in boundaries in the set of segments produced by the human log data interpreter are adjusted on the basis of the comparison.

4. The computer-implemented method as in claim 1, wherein the previously interpreted depositional units are previously interpreted by a human log data interpreter.

5. The computer-implemented method as in claim 1, wherein the previously interpreted depositional units are previously interpreted by an expert system.

6. The computer-implemented method as in claim 1, wherein, for each segment, a value of the data is set equal to an average value of the data for the segment.

7. The computer-implemented method as in claim 1, wherein the previously interpreted depositional units are from a region having a same depositional environment as the subterranean formation.

8. The computer-implemented method as in claim 1, wherein the well log data are gamma ray data.

9. A system for automated interpretation of well log data indicative of physical attributes of a portion of a subterranean formation comprising:
    a data storage device, configured and arranged to store the well log data;
    a processor, configured and arranged to execute machine executable instructions to partition the well log data into segments, each segment representing a respective contiguous portion of the extent of the logged well; define a membership function for each segment, the membership function defining a degree to which each segment belongs to a defined set; determine, based on attribute values derived from previously interpreted depositional units, and the membership functions, a depositional type for each segment; and converting, via computer, the well log data to shale volume data, wherein the shale volume data are represented as a series of numerical values $V_{sh} = s_1, s_2, \ldots, s_i$, where $s_i$ is an average of the shale volume data within the ith segment.

10. The system as in claim 9, further including an input device, configured and arranged for a user to input adjustments to boundaries of the segments.

11. The system as in claim 9, further including machine readable data including the previously interpreted depositional units, and wherein the previously interpreted depositional units comprises human-interpreted depositional units.

12. The system as in claim 9, wherein the processor is further configured and arranged to partition the well log data into segments by applying at least one variation criterion to the well log data such that each segment represents data varying from neighboring data by an amount less than the variation criterion.

* * * * *